United States Patent
Watanabe (10) Patent No.: US 10,511,046 B2
(45) Date of Patent: Dec. 17, 2019

(54) FUEL CELL ASSEMBLING METHOD AND FUEL CELL ASSEMBLING APPARATUS

(71) Applicant: TOYOTA JIDOSHA KABUSHIKI KAISHA, Toyota-shi, Aichi-ken (JP)

(72) Inventor: Kazuhiro Watanabe, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 678 days.

(21) Appl. No.: 14/748,479

(22) Filed: Jun. 24, 2015

(65) Prior Publication Data

US 2015/0380761 A1    Dec. 31, 2015

(30) Foreign Application Priority Data

Jun. 25, 2014  (JP) ................. 2014-130701

(51) Int. Cl.
  *H01M 8/04*     (2016.01)
  *H01M 8/248*    (2016.01)
  *H01M 8/2404*   (2016.01)

(52) U.S. Cl.
  CPC ......... *H01M 8/248* (2013.01); *H01M 8/2404* (2016.02)

(58) Field of Classification Search
  CPC ................. H01M 8/2404; H01M 8/248
  See application file for complete search history.

(56) References Cited

U.S. PATENT DOCUMENTS

| 2008/0145713 A1* | 6/2008 | Connor | H01M 8/248 |
| | | | 429/470 |
| 2015/0340669 A1* | 11/2015 | Aoki | H01M 2/1077 |
| | | | 429/151 |

FOREIGN PATENT DOCUMENTS

| JP | 2004-253269 A | 9/2004 | |
| JP | 2007-280890 | 10/2007 | |
| JP | 2010-61965 | 3/2010 | |
| JP | 2011-065909 A | 3/2011 | |
| WO | 2013-257953 A | 12/2013 | |
| WO | WO-2014125605 A1 * | 8/2014 | .......... H01M 2/1077 |

* cited by examiner

*Primary Examiner* — Adam A Arciero
(74) *Attorney, Agent, or Firm* — Finnegan, Henderson, Farabow, Garrett & Dunner, LLP

(57) ABSTRACT

A fuel cell assembling apparatus includes: a tensile load application device that pulls a coupling plate to apply a tensile load to the coupling plate of which a first end portion is fixed to a first end plate, the tensile load application device being temporarily fixed to a second end portion of the coupling plate; a compressive load application device that applies a compressive load to a cell stack of a fuel cell; and a fixing device that fixes the second end portion of the coupling plate to which the tensile load is applied, and a second end plate to each other. The tensile load application device applies the tensile load to the coupling plate by using a reaction force generated in response to the compressive load applied to the cell stack by the compressive load application device.

2 Claims, 10 Drawing Sheets

FUEL CELL ASSEMBLING METHOD AND FUEL CELL ASSEMBLING APPARATUS

INCORPORATION BY REFERENCE

The disclosure of Japanese Patent Application No. 2014-130701 filed on Jun. 25, 2014 including the specification, drawings and abstract is incorporated herein by reference in its entirety.

BACKGROUND OF THE INVENTION

1. Field of the Invention

The invention relates to a fuel cell assembling method and a fuel cell assembling apparatus.

2. Description of Related Art

In a fuel cell, a cell stack, which is a plurality of cells stacked on each other, is sandwiched in a compressed state between end plates respectively disposed at opposite ends of the cell stack in the cell stacking direction, and the end plates are coupled to each other by tension plates.

Japanese Patent Application Publication No. 2010-061965 (JP 2010-061965 A) describes an example of a method of assembling the above-described fuel cell. According to JP 2010-061965 A, one of end plates is fixed to tension plates in advance. Then, while a compressive load is applied to the cell stack, the compressive load is measured. When the compressive load reaches a prescribed value, the other end plate is fixed to the tension plates.

However, according to the fuel cell assembling method as described above, a tensile load, which is a reaction force against the compressive load, is applied to the tension plates and the end plates only after the tension plates and the end plates are fixed together. Hence, the tension plates and the end plates may be extended and deformed after the tension plates and the end plates are fixed together and thus the cell stack may be loosened, resulting in reduction in the compressive load acting on the cell stack. Reduction in the compressive load acting on the cell stack may cause, for example, leakage of fuel gas and oxidation gas flowing through the cell stack.

SUMMARY OF THE INVENTION

The invention suppresses deformation of a coupling members, such as tension plates, and end plates after the coupling members and end plates are fixed together, thereby suppressing reduction in a compressive load acting on a cell stack of a fuel cell.

A first aspect of the invention relates to a fuel cell assembling method. According to the fuel cell assembling method, in a state where a prescribed tensile load is applied to a coupling member of which a first end portion is fixed to a first end plate and a prescribed compressive load is applied to a cell stack of a fuel cell, a second end portion of the coupling member is fixed to a second end plate.

The coupling member is fixed to the second end plate in the state where the tensile load is applied to the coupling member. Thus, it is possible to suppress deformation of the coupling member and the end plates after the coupling member and the end plates are fixed together, thereby suppressing reduction in the compressive load acting on the cell stack of the fuel cell.

In the fuel cell assembling method according to the first aspect, the tensile load may be applied to the coupling member by using a reaction force against the compressive load acting on the cell stack.

A second aspect of the invention relates to a fuel cell assembling apparatus including: a tensile load application device that pulls a coupling member to apply a tensile load to the coupling member of which a first end portion is fixed to a first end plate, the tensile load application device being temporarily fixed to a second end portion of the coupling member; a compressive load application device that applies a compressive load to a cell stack of a fuel cell; and a fixing device that fixes the second end portion of the coupling member to which the tensile load is applied, and a second end plate to each other. The tensile load application device applies the tensile load to the coupling member by using a reaction force generated in response to the compressive load applied to the cell stack by the compressive load application device.

The coupling member is fixed to the second end plate in the state where the tensile load is applied to the coupling member. Thus, it is possible to suppress deformation of the coupling member and the end plates after the coupling member and the end plates are fixed together, thereby suppressing reduction in the compressive load acting on the cell stack of the fuel cell.

According to the invention, it is possible to suppress deformation of the coupling member and the end plates after the coupling member and the end plates are fixed together, thereby suppressing reduction in the compressive load acting on the cell stack of the fuel cell.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, example embodiments of the invention will be described in detail with reference to the accompanying drawings. Unless otherwise specified, the positional relationships such as upper, lower, right and left are based on the positional relationships illustrated in the drawings. The dimensional ratios are not limited to those illustrated in the drawings. The following embodiments are for illustrative purposes only and are not intended to limit the invention in any aspect. The invention may be implemented in various other embodiments within the scope of the invention.

Figure 1:
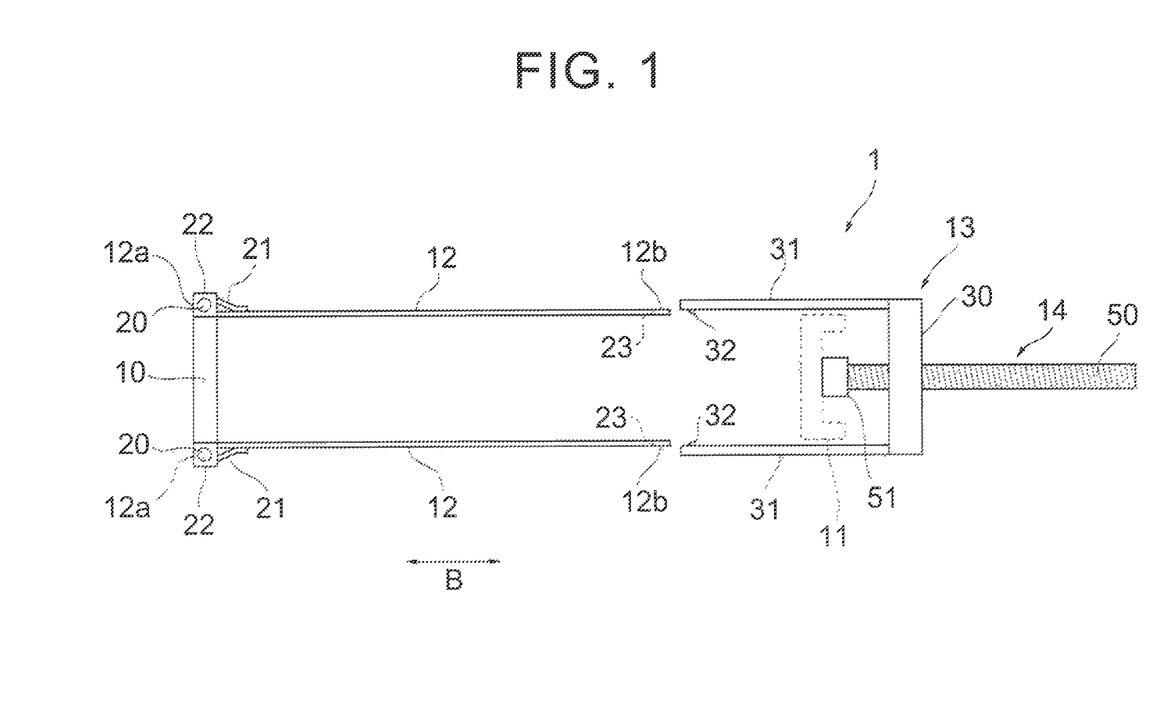
FIG. 1 is a side view of a fuel cell assembling apparatus according to an embodiment of the invention.
Figure 2:
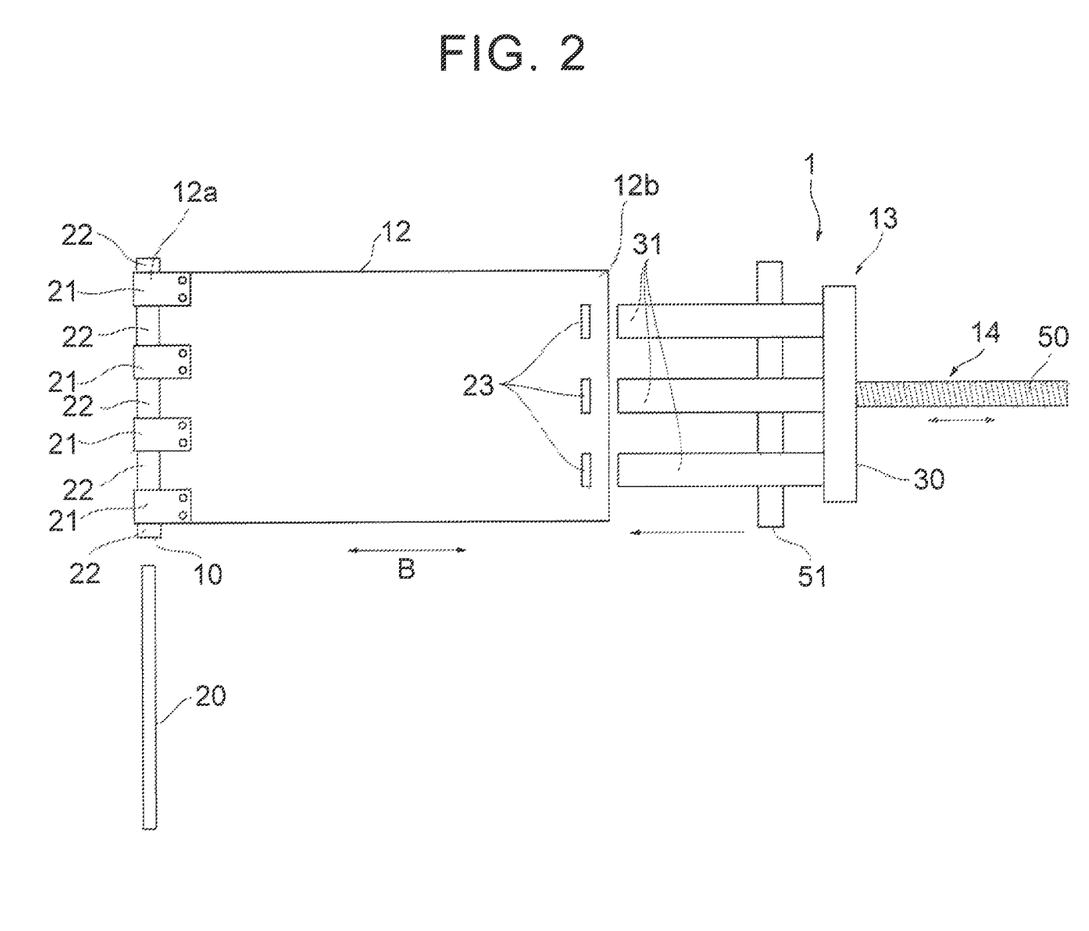
FIG. 2 is a plan view of the fuel cell assembling apparatus illustrated in FIG. 1.

FIG. 1 is a side view illustrating the schematic configuration of a fuel cell assembling apparatus 1 according to an embodiment of the invention. FIG. 2 is a top view of the fuel cell assembling apparatus 1.

Figure 7:
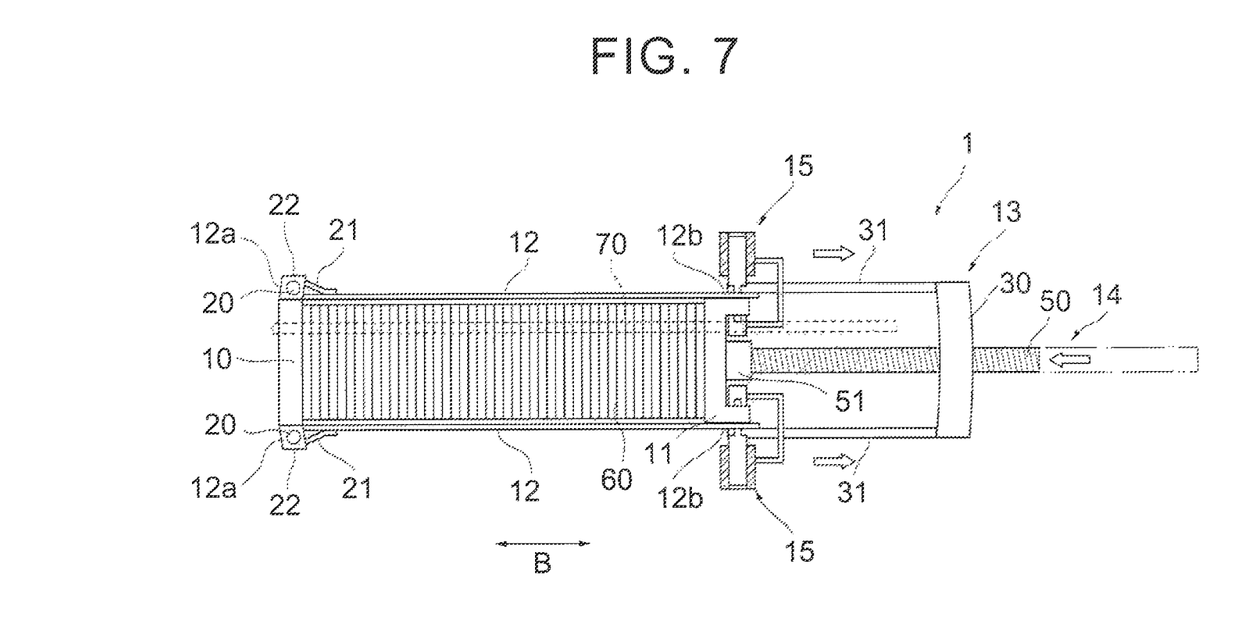
FIG. 7 is a view illustrating a state where swaging is performed by swaging devices.

The fuel cell assembling apparatus 1 includes a tensile load application device 13, a compressive load application device 14, and fixing devices 15 (illustrated in FIG. 7). The tensile load application device 13 is temporarily fixed to end portions 12b of upper and lower coupling plates 12 of which end portions 12a are fixed to a first end plate 10. The coupling plates 12 may function as coupling members. Note that, in the following description, the end portion 12a of each coupling plate 12 will be referred to as the first end portion 12a, and the end portion 12b of each coupling plate 12 will be referred to as the second end portion 12b. The tensile load application device 13 pulls the coupling plates 12 to apply a tensile load to the coupling plates 12. The compressive load application device 14 applies a compressive load to a cell stack 60 of a fuel cell. The fixing devices 15 fix the second end portions 12b of the coupling plates 12, to which the tensile load is applied, and a second end plate 11 to each other.

Figure 3:
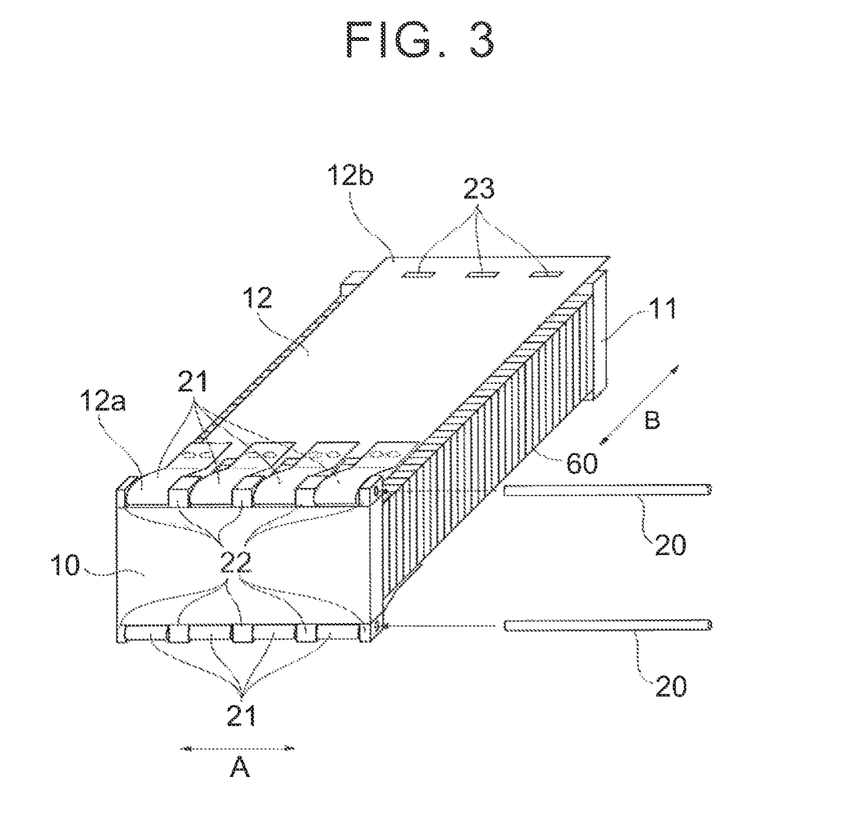
FIG. 3 is a perspective view illustrating a state where coupling plates are fixed to a first end plate.

The coupling plates 12 couple the first end plate 10 and the second end plate 11 to each other. Each coupling plate 12 is in the form of a rectangular plate, and the first end portions 12a of the coupling plates 12 are respectively fixed to the upper and lower portions of the first end plate 10. As illustrated in FIG. 2 and FIG. 3, the first end portion 12a of each coupling plate 12 is provided with annular portions 21 through which a fixing pin 20 is passed. The annular portions 21 are arranged at prescribed intervals in the width direction of the coupling plate 12 (direction A in FIG. 3). Annular portions 22, through which the fixing pin 20 is passed, are formed on each of the upper and lower end surfaces of the first end plate 10. The annular portions 21 and the annular portions 22 are arranged at such positions that the annular portions 21 and the annular portions 22 do not interfere with each other. For example, the annular portions 21 and the annular portions 22 are arranged alternately in the width direction (direction A in FIG. 3). By passing the fixing pin 20 through the annular portions 21 and the annular portions 22, the first end portion 12a of each coupling plate 12 is fixed to the first end plate 10. Consequently, the two coupling plates 12 parallel to each other extend horizontally in one direction (direction B in FIG. 2 and FIG. 3) from the upper and lower portions of the first end plate 10. The second end portion 12b of each coupling plate 12 has holes 23 in which later-described hooks 32 are engaged. The coupling plates 12 are made of, for example, high-tensile steel plates.

As illustrated in FIG. 1 and FIG. 2, the tensile load application device 13 includes a base portion 30 having, for example, a rectangular shape, and a plurality of arm portions 31 extending in the one direction (direction B) from the upper and lower portions of the base portion 30. Each arm portion 31 is in the form of, for example, an elongated plate, and has the hook 32 that is engaged in a corresponding one of the holes 23 of the coupling plate 12. The hook 32 is formed on the inner side of the distal end of each arm portion 31. Each of the upper and lower coupling plates 12 has three arm portion 31. The base portion 30 is made of, for example, aluminum, and the arm portions 31 are made of, for example, stainless steel.

The compressive load application device 14 includes an operating rod 50 and a pressing portion 51. The operating rod 50 is passed in the one direction (direction B) through the center of the base portion 30 of the tensile load application device 13. The operating rod is movable back and forth in the one direction (direction B). The pressing portion 51 is provided at the distal end of the operating rod 50, and presses the second end plate 11. The pressing portion 51 has, for example, a rectangular prism shape. The longitudinal direction of the pressing portion 51 is perpendicular to the arm portions 31, and coincides with the horizontal direction. The operating rod 50 has a threaded surface and is screwed into a threaded hole of the base portion 30 so as to be joined to the base portion 30. Alternatively, the operating rod 50 and the base portion 30 may be joined together with the use of a hydraulic cylinder, a servo press actuator, or the like. The operating rod 50 is made of, for example, chromium-molybdenum steel, and the pressing portion 51 is made of, for example, aluminum.

Each fixing device 15 is, for example, a swaging device as illustrated in FIG. 7. The fixing device 15 swages the coupling plate 12 inward in its thickness direction, thereby fixing the coupling plate 12 to the second end plate 11.

Figure 4:
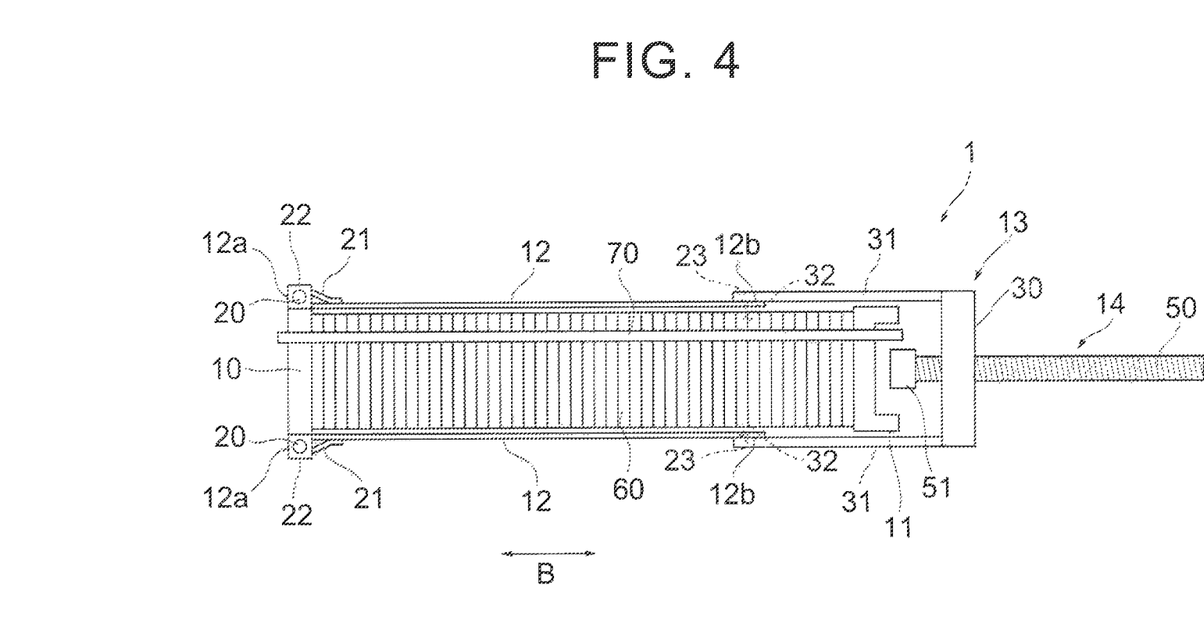
FIG. 4 is a view illustrating a state where a cell stack and a second end plate are disposed between the coupling plates.
Figure 5:
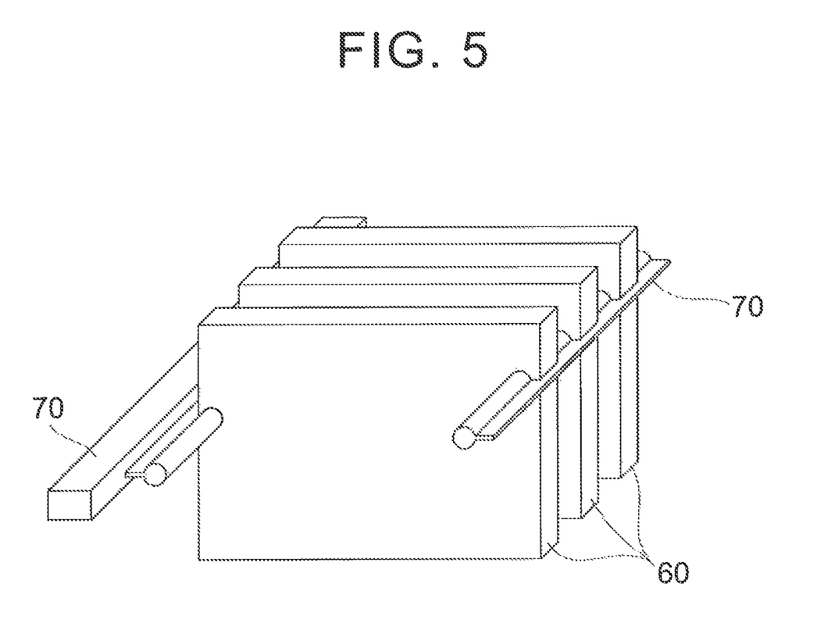
FIG. 5 is a view illustrating the configuration of suspending-type side-disposition stack guides.

Next, description will be provided on one example of a fuel cell assembling method in which the above-described assembling apparatus 1 is used. First, as illustrated in FIG. 2 and FIG. 3, the fixing pins 20 are passed through the annular portions 21, 22, so that the first end portions 12a of the coupling plates 12 are fixed to the first end plate 10. Then, as illustrated in FIG. 4, the cell stack 60 formed of a plurality of cells and the second end plate 11 are placed between the upper and lower coupling plates 12. At this time, the cell stack 60, the first end plate 10, and the second end plate 11 are supported together by suspending-type side-disposition stack guides 70 (support portions). The suspending-type side-disposition stack guides 70 are passed through right and left end portions of the cell stack 60 in the cell stacking direction, for example, as illustrated in FIG. 5. In this way, the suspending-type side-disposition stack guides 70 support the cell stack 60 in such a manner that the cell stack 60 is suspended by suspending-type side-disposition stack guides 70 as illustrated in FIG. 5.

Then, the tensile load application device 13 is attached to the coupling plates 12. Specifically, the hooks 32 at the distal ends of the area portions 31 of the tensile load application device 13 are engaged in the holes 23 at the second end portions 12b of the coupling plates 12. As a result, the arm portions 31 are temporarily fixed to the second end portions 12b of the coupling plates 12.

Figure 6:
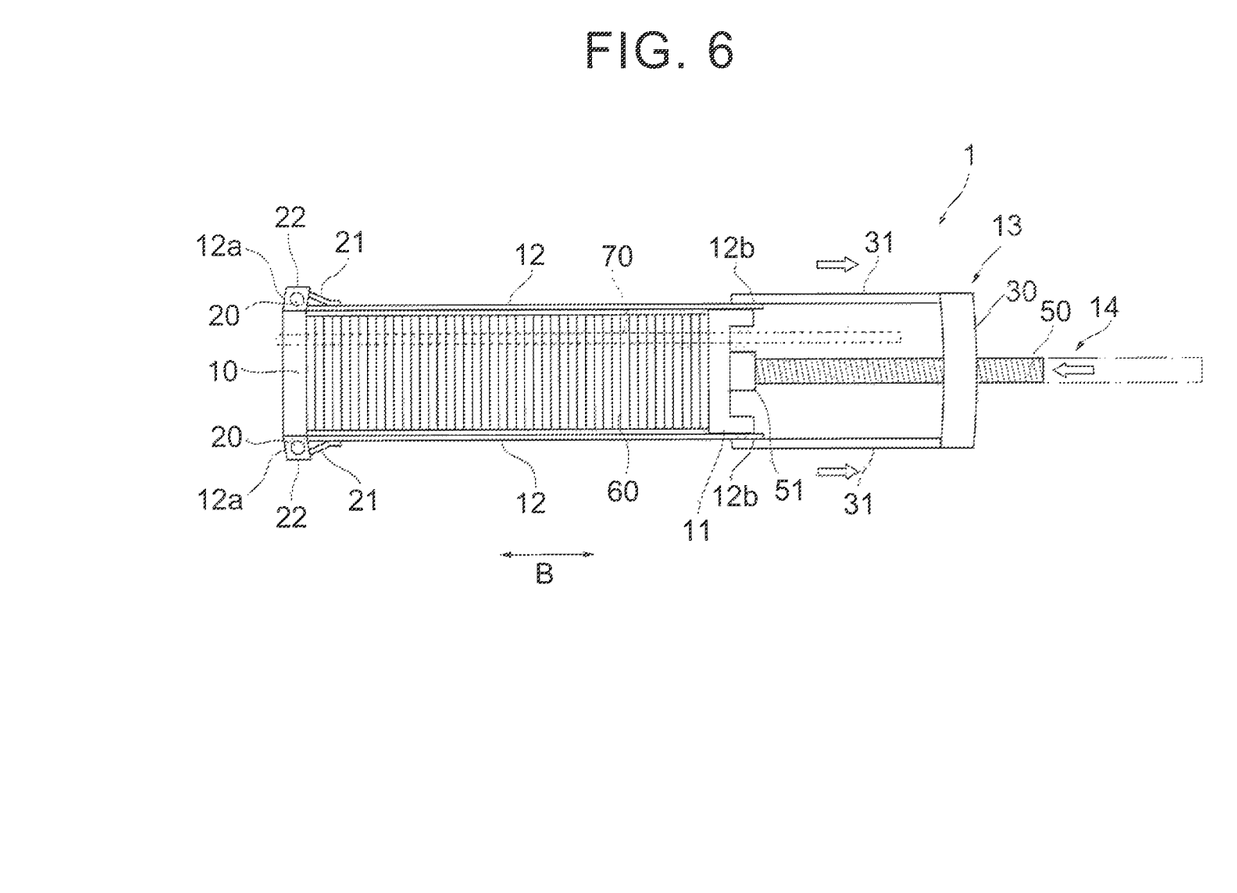
FIG. 6 is a view illustrating a state where the cell stack is compressed.

Then, as illustrated in FIG. 6, the operating rod 50 of the compressive load application device 14 is moved to press the second end plate 11 toward the cell stack 60 and the first end plate 10 with the pressing portion 51. Consequently, the cell stack 60 is compressed, so that a prescribed compressive load is applied to the cell stack 60. At this time, the arm portions 31 are pulled in a direction opposite to the compression direction due to a reaction force against the compressive load. As a result, a tensile load is applied to the coupling plates 12.

Next, as illustrated in FIG. 7, in the state where the compressive load is applied to the cell stack 60 while the tensile load is applied to the coupling plates 12, the second end portions 12b of the coupling plates 12 are fixed to the second end plate 11 by the fixing devices 15. At this time, the second end portions 12b of the coupling plates 12 are swaged inward by the fixing devices 15, which are swaging devices in the present embodiment.

Figure 8:
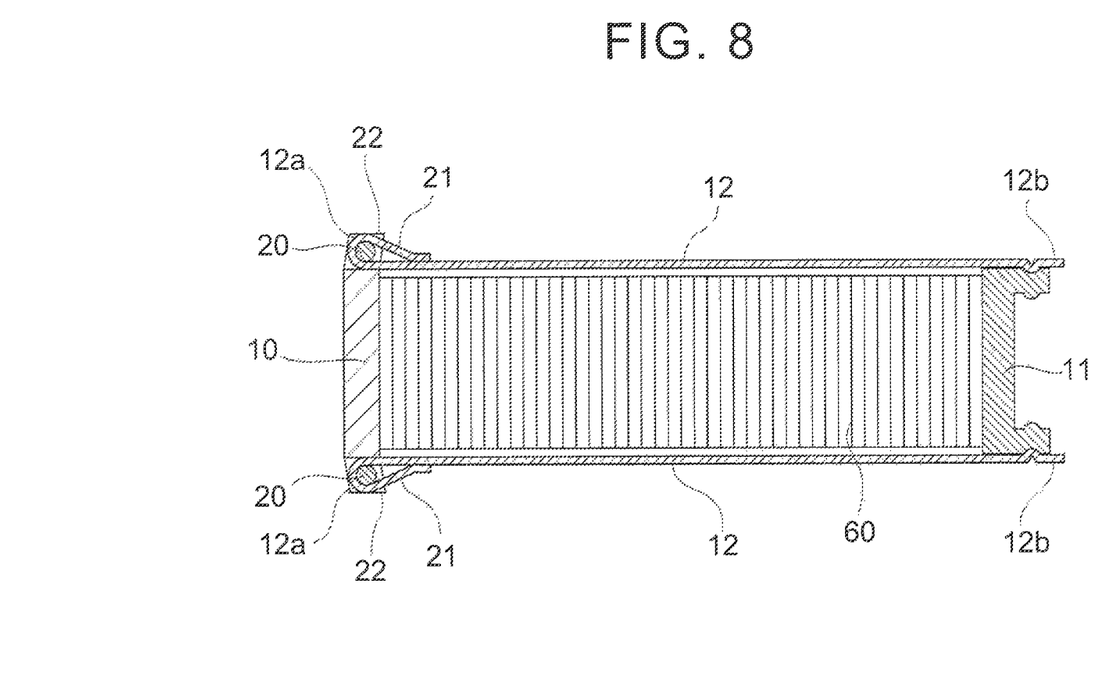
FIG. 8 is a view illustrating an assembled fuel cell.

Then, as illustrated in FIG. 8, the tensile load application device 13, the compressive load application device 14, and the fixing device 15 are removed from the coupling plates 12, so that the process of assembling the fuel cell is completed.

According to the present embodiment, the second end portions 12b of the coupling plates 12 are fixed to the second end plate 11 in the state where a prescribed tensile load is applied to the coupling plates 12 of which the first end portions 12a are fixed to the first end plate 10 and a prescribed compressive load is applied to the cell stack 60 formed of a plurality of cells. Thus, the tensile load is applied to the coupling plates 12 in advance before the end plates 10, 11 and the coupling plates 12 are fixed together. As a result, it is possible to suppress deformation of the coupling plates 12 and the end plates 10, 11, which may be caused after the coupling plates 12 and the end plates 10, 11 are fixed together, thereby suppressing reduction in the compressive load acting on the cell stack 60. Because reduction in the compressive load acting on the cell stack 60 is suppressed, the compressive load acting on the cell stack 60 is brought closer to a design value. Thus, the accuracy of a fuel cell assembly load is easily kept at a satisfactory level. Further, the coupling plates 12 and the end plates 10, 11 need not be made of an expensive hard-to-deform material. This makes it possible to reduce cost and to enhance the degree of freedom in selecting materials.

The tensile load application device 13 applies a tensile load to the coupling plates 12 by using a reaction force acting on the cell stack 60 when a compressive load is applied to the cell stack 60 by the compressive load application device 14. Thus, the fuel cell assembling apparatus is simplified and slimmed down, leading to cost reduction.

While one example embodiment of the invention has been described above with reference to the accompanying drawings, the invention is not limited to the above-described embodiment.

Figure 9:
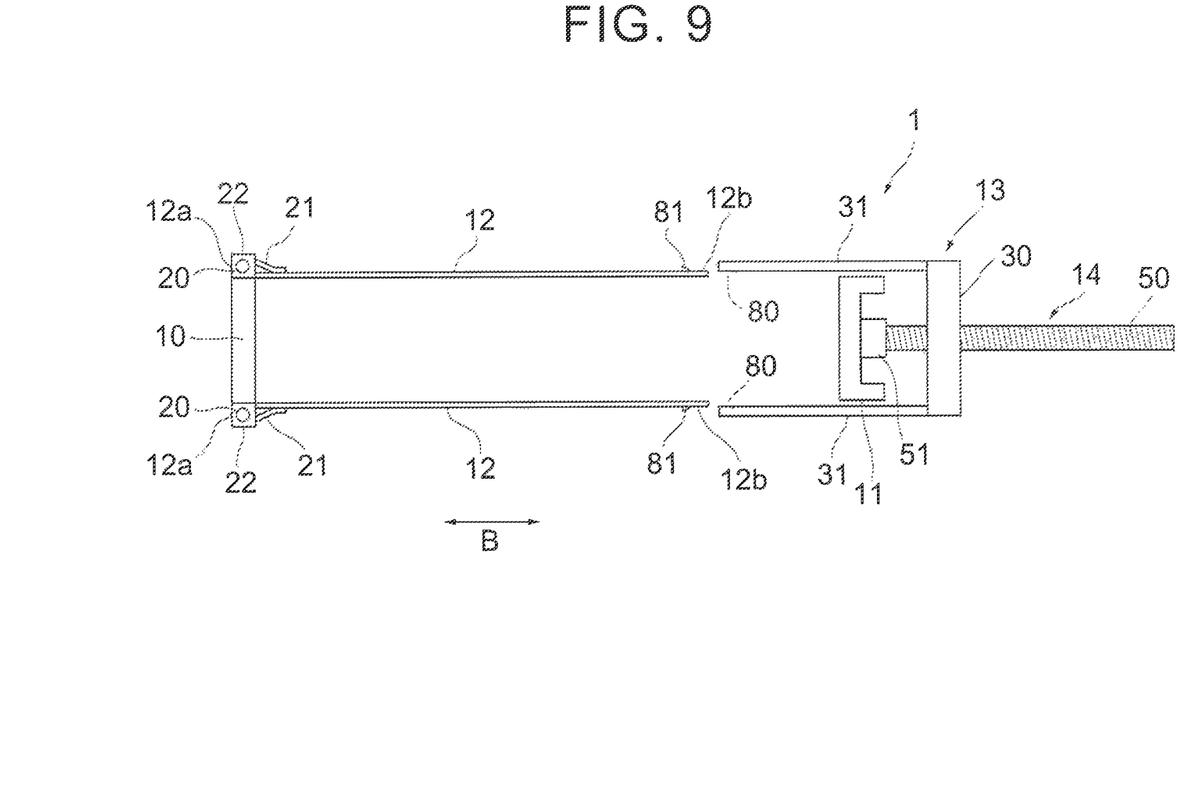
FIG. 9 is a side view illustrating a fuel cell assembling apparatus according to another embodiment of the invention, in which arm portions have holes and coupling plates have hooks.

For example, in the above-described embodiment, the arm portions 31 of the tensile load application device 13 have the hooks 32 and the coupling plates 12 have the holes 23. Alternatively, as illustrated in FIG. 9, arm portions 31 may have holes 30 and coupling plates 12 may have hooks 81 that protrude outward.

In the above-described embodiment, only fixation of the second end portions 12b of the coupling plates 12 and the second end plate 11 is achieved by swaging. In addition, fixation of the first end portions 12a of the coupling plates 12 and the first end plate 10 may be achieved by swaging. In this case, the junctions between the coupling plates 12 and the first end plate 10 are simplified in structure, leading to cost reduction. The coupling plates 12 and the first end plate 10 may be fixed together according to another method.

Figure 10:
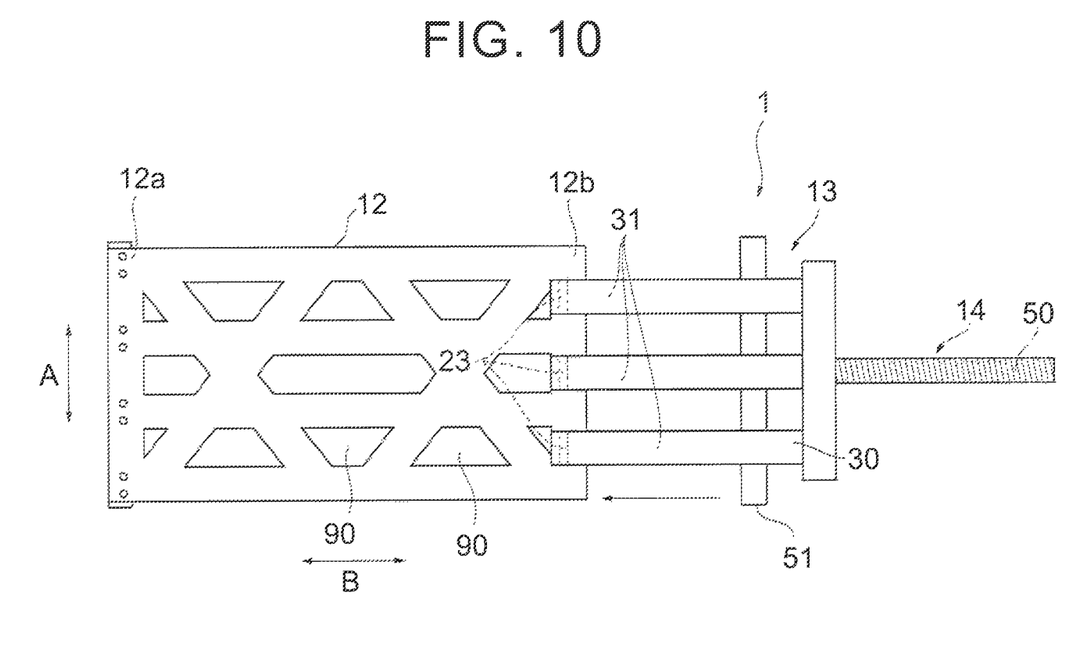
FIG. 10 is a view illustrating the configuration of a coupling plate according to another embodiment of the invention.

The coupling plates 12 may have another configuration. For example, as illustrated in FIG. 10, each coupling plate 12 may have punched portions 90. In this case, the coupling plates 12 are reduced in weight.

The tensile load application device 13 may have another configuration achieved by a commonly-used technique as long as the tensile load application device 13 is able to apply a tensile load to the coupling plates 12. Likewise, the compressive load application device 14 may have another configuration achieved by a commonly-used technique as long as the compressive load application device 14 is able to apply a compressive load to the cell stack 60. Each fixing device 15 is not limited to a swaging device, and may fix the coupling plates 12 and the first and second end plates 10, 11 together by another method in which screws, pins, or the like are used.

The invention suppresses deformation of coupling members and end plates, thereby suppressing reduction in a compressive load acting on a cell stack of a fuel cell.

What is claimed is:

1. A fuel cell assembling method comprising:
fixing a first end portion of a coupling member to a first end plate;
temporarily fixing a tensile load application device to a second end portion of the coupling member by engaging a plurality of hooks at distal ends of arm portions of the tensile load application device in a plurality of holes at the second end portion of the coupling member;
fixing, in a state where a prescribed tensile load is applied to the coupling member and a prescribed compressive load is applied to a cell stack of a fuel cell by a compressive load application device, the second end portion of the coupling member to a second end plate by a fixing device, wherein:
the fixing device is a swaging device, and
the second end portion of the coupling member is swaged inward in a thickness direction of the coupling member by the swaging device; and
removing the tensile load application device and the fixing device from the second end portion of the coupling member, and removing the compressive load application device from the cell stack, wherein:
the prescribed compressive load applied to the cell stack is maintained after removal of the tensile load application device and the fixing device from the second end portion, and removal of the compressive load application device from the cell stack.

2. A fuel cell assembling method comprising:
fixing a first end portion of a coupling member to a first end plate;
temporarily fixing a tensile load application device to a second end portion of the coupling member by engaging a plurality of hooks that protrude outward at the second end portion of the coupling member in a plurality of holes at distal ends of arm portions of the tensile load application device;
fixing, in a state where a prescribed tensile load is applied to the coupling member and a prescribed compressive load is applied to a cell stack of a fuel cell by a compressive load application device, the second end portion of the coupling member to a second end plate by a fixing device, wherein:
the fixing device is a swaging device, and
the second end portion of the coupling member is swaged inward in a thickness direction of the coupling member by the swaging device; and
removing the tensile load application device and the fixing device from the second end portion of the coupling member, and removing the compressive load application device from the cell stack, wherein:
the prescribed compressive load applied to the cell stack is maintained after removal of the tensile load application device and the fixing device from the second end portion, and removal of the compressive load application device from the cell stack.

* * * * *